United States Patent
Nagashima (10) Patent No.: US 6,339,968 B1
(45) Date of Patent: Jan. 22, 2002

(54) SHIFT LEVER APPARATUS (75) Inventor: Katsushi Nagashima, Aichi-ken (JP)

(73) Assignee: Kabushiki Kaisha Tokai-Rika-Denki Seisakusho (JP)

( * ) Notice: Subject to any disclaimer, the term of this patent is extended or adjusted under 35 U.S.C. 154(b) by 0 days.

(21) Appl. No.: 09/505,846

(22) Filed: Feb. 17, 2000

(30) Foreign Application Priority Data

Mar. 24, 1999 (JP) .......................................... 11-079798

(51) Int. Cl.[7] .............................................. F16H 59/02
(52) U.S. Cl. .................................. 74/473.25; 192/220.3
(58) Field of Search ........................ 74/473.1, 473.21, 74/473.23, 473.24, 473.25, 473.26, 473.28, 538, 543, 544, 545, 483 R; 192/220.3, 220.04

(56) References Cited

U.S. PATENT DOCUMENTS

| 4,905,802 | A | * | 3/1990 | Gotoh | 192/220.4 X |
| 5,220,984 | A | * | 6/1993 | Ruiter | 74/473.23 X |
| 5,465,818 | A | * | 11/1995 | Osborn et al. | 74/483 X |
| 5,494,141 | A | * | 2/1996 | Osborn et al. | 192/220.4 X |
| 5,540,180 | A | | 7/1996 | Kataumi et al. | |
| 5,759,132 | A | * | 6/1998 | Osborn et al. | 192/220.4 X |
| 5,924,540 | A | * | 7/1999 | Kim | 74/483 X |

* cited by examiner

Primary Examiner—David A. Bucci
Assistant Examiner—Colby Hansen
(74) Attorney, Agent, or Firm—Nixon Peabody LLP; Thomas W. Cole (57) ABSTRACT A shift lever apparatus comprises a shift lever connected to a gearbox of a vehicle, a rod integrally moved together with the shift lever within the shift lever due to shift-operation of the lever, a detent member having a detent hole formed therein, a restricting portion formed on the detent hole, and a base member supporting the shift lever in a pivotable manner. The shift lever, by being shift-operated to a predetermined shift position, changes a shift range to a predetermined shift range which corresponds to the predetermined shift position, among a plurality of shift ranges set at the gearbox. The rod has a projection portion toward an outer side of the lever and movable with respect to the shift lever due to a releasing operation. The projection portion penetrates and enters into the detent member located opposite the projection portion along a direction in which the projection portion moves as the lever is shift-operated. The restricting portion can be avoided by a releasing operation. The base member has a first holding portion holding the detent member on one side of the lever and has a second holding member holding the detent member on the opposite side of the lever. The base member is made substantially integral with the detent member by the detent member being in at least one of the first holding portion and the second holding portion.

20 Claims, 8 Drawing Sheets

SHIFT LEVER APPARATUS

BACKGROUND OF THE INVENTION

1. Field of the Invention

The present invention relates to a shift lever apparatus which is provided in a vehicle for the operation of changing a shift range of a gearbox.

2. Description of the Related Art

In a floor shift-type shift lever apparatus provided between a driver's seat of a vehicle and the front passenger's seat, a shift lever for operation is provided at a position which is further toward the front passenger's seat than a central portion in the left-right direction (widthwise direction) of the vehicle between the driver's seat and the front passenger's seat. Furthermore, characters or the like corresponding to the respective shift ranges of an automatic gearbox are formed further toward the driver's seat than a region at which the shift lever passes through a housing of the shift lever apparatus. Furthermore, at the driver's seat side of the shift lever, there are provided members such as a detent plate, a shift-lock plate, a shift lock solenoid, and the like which form a so-called shift lock mechanism, which is a mechanism for locking the shift lever so that the shift lever cannot be operated from a parking position which is a shift position of the shift lever corresponding to a parking range for locking the drive wheels of the vehicle, except for under a predetermined condition, such as when the braking pedal is depressed.

Even with the same vehicle types which have the same basic specifications, there are available a so-called "right-hand drive vehicle" in which the driver's seat is provided on the right side of the vehicle relative to the front passenger's seat and a so-called "left-hand drive vehicle" in which the positions of the driver's seat and the front passenger's seat are located opposite to their positions in a "right-hand drive vehicle". In the "right-hand drive vehicle" and the "left-hand drive vehicle", the positions of the shift lever and the respective members of the shift-lock mechanism are located opposite to each other at the left and right sides of the vehicle transverse direction center. However, with the conventional shift lever apparatus, a case or the like for accommodating the detent plate and the shift-lock mechanism is usually made integral in advance with a base for supporting the shift lever. Thus, even though their basic functions are the same, each of the members forming the shift lock mechanism and the like is made in a different configuration or the like for the "right-hand vehicle" and the "left-hand vehicle", in consideration of the arrangement position thereof or the like. As a result, even when the basic specifications are the same, two types of each part must be prepared: one for use in a "right-hand drive vehicle" and the other for use in the "left-hand drive vehicle".

SUMMARY OF THE INVENTION

An object of the present invention is to provide a shift lever apparatus whose basic members can be commonly used both in a right-hand drive vehicle and a left-hand drive vehicle.

The shift lever apparatus according to the present invention includes a shift lever connected to a gearbox of a vehicle, the shift lever, by being shift-operated to a predetermined shift position, changing a shift range to a predetermined shift range which corresponds to the predetermined shift position, among a plurality of shift ranges set at the gearbox; a rod integrally moved together with the shift lever within the shift lever due to shift-operation of the shift lever, the rod having a projection portion which is movable with respect to the shift lever due to a releasing operation and which projects toward an outer side of the shift lever; a detent member through which the projection portion penetrates and enters into the detent member, the detent member being at the same time, located opposite the projection portion along a direction in which the projection portion moves as the shift lever is shift-operated, the detent member having a detent hole formed therein, a restricting portion formed on the detent hole which can be avoided by a releasing operation; and a base member supporting the shift lever in a pivotable manner, the base member having a first holding portion holding the detent member on one side of the shift lever and having a second holding portion holding the detent member on the opposite side of the shift lever, the base member being made substantially integral with the detent member by the detent member being in at least one of the first holding portion and the second holding portion.

With the shift lever apparatus which is formed in the manner described above, when the shift lever is shift-operated to the predetermined shift position, the shift range of the gearbox is changed to a shift range corresponding to the shift position. Furthermore, in a state in which the shift lever is located at a specific shift position, the projection portion of the rod, which enters into the detent hole formed in the detent member, is located opposite to the restricting portion along the direction in which the projection portion moves as the shift lever is shift-operated to another shift position. Movement of the projection portion is limited by the restricting portion, and the shift-operation of the shift lever to another shift position is indirectly restricted. This restricted state cannot be released unless the projection portion is relatively moved with respect to the shift lever due to a releasing operation. As a result, inadvertent shift operation from the specific shift position can be suppressed.

In the shift lever apparatus according to the present invention, the first holding portion and the second holding portion are respectively formed on the base member which supports the shift lever. The detent member and the base member are made integral by the detent member being held either in the first holding portion or in the second holding portion. Here, in the state in which the detent member is held in the second holding portion, the relative positions of the detent member and the shift lever are opposite to those in a state in which the detent member is held in the first holding portion. Consequently, the shift lever apparatus according to the present invention, can be applied both to a "right-hand drive vehicle" and a "left-hand drive vehicle" depending on which of the first holding portion and the second holding portion the detent member is held in. In this way, the detent member and the base member can be used in both a "right-hand drive vehicle" and a "left-hand drive vehicle".

Preferably, the shift lever apparatus according to the present invention includes an engaging member provided inside the detent member and engageable with the projection portion penetrating through the detent member and in an engaged state, the engaging member moving along with relative movement of the projection portion with respect to the shift lever; and a shift lock device which provided at the detent member and restricting movement of the engaging member with respect to the projection portion, which movement accompanies the releasing operation, the shift lock device locking the projection portion indirectly via the engaging member.

In the shift lever apparatus which is formed in the above manner, when the shift lever is located at a specific shift position and the projection portion which has entered into the detent hole is engaged with the engaging member provided at the inner side of the detent member, the engaging member moves together with the rod which moves due to the releasing operation. Restricting the movement of the engaging member by the shift lock device restricts the movement of the projection portion (rod) due to the releasing operation. Consequently, in this state, the releasing operation cannot be carried out, and the state of the projection portion and the restricting portion being opposed to each other cannot be cancelled. As a result, inadvertent shift operation from the specific shift position can be suppressed even more.

Here, the engaging member is provided inside of the detent member, and the shift lock device is also provided at the detent member. Thus, the above-described effects are achieved regardless of whether the detent member is held is the first holding portion or the second holding portion. Consequently, in this shift lock device, the shift lock device and the engaging member, as well as the detent member and the base member, can be used both in a "right-hand drive vehicle" and in a "left-hand drive vehicle".

Preferably, the shift lock device according to the present invention also comprises an elastic member having a base end side fixed to the shift lever and distal end side pressing against the detent member with a spring force, the distal end side being moved along the detent member in the pressed state when the shift lever is shift-operated; and an adjustment hole which is formed in the detent member and into which the distal end of the elastic member enters due to resilient force of the elastic member in a state in which the hole is located opposite to the distal end of the elastic member in a state in which the shift lever is located at the predetermined shift position.

According to the shift lever apparatus which is structured in the manner described above, when the shift lever is shift-operated to the predetermined shift position, the distal end side of the elastic member provided at the shift lever enters into the adjustment hole which is formed in the detent member. The impact generated at the time when the elastic member enters into the control member is transmitted to the hand or the like of an operator so that the operator can confirm the shift position of the shift lever without a visual confirmation thereof.

By the way, in the case where plural adjustment holes are formed in correspondence to the respective shift positions, an interval between respective adjustment holes corresponds to a movement amount of the projection portion of the rod which moves in the detent hole as the shift lever is shift-operated. As a result, the configuration and the position of the detent hole, the position of the shift lock device, and the positions of the adjustment holes correspond to each other. Here, in the present shift lever apparatus, since the adjustment holes are formed in the detent member, the configuration and position of the detent hole, the position of the shift lock device, and the intervals between and formed positions of the adjustment holes can be formed at the time the detent member is formed. In this way, at the time the respective members are being assembled together, relative errors between the configuration or position of the detent hole, the position of the shift lock device, and the distances between or the formed positions of the adjustment holes can be suppressed or prevented.

DESCRIPTION OF THE PREFERRED EMBODIMENTS

Figure 1:
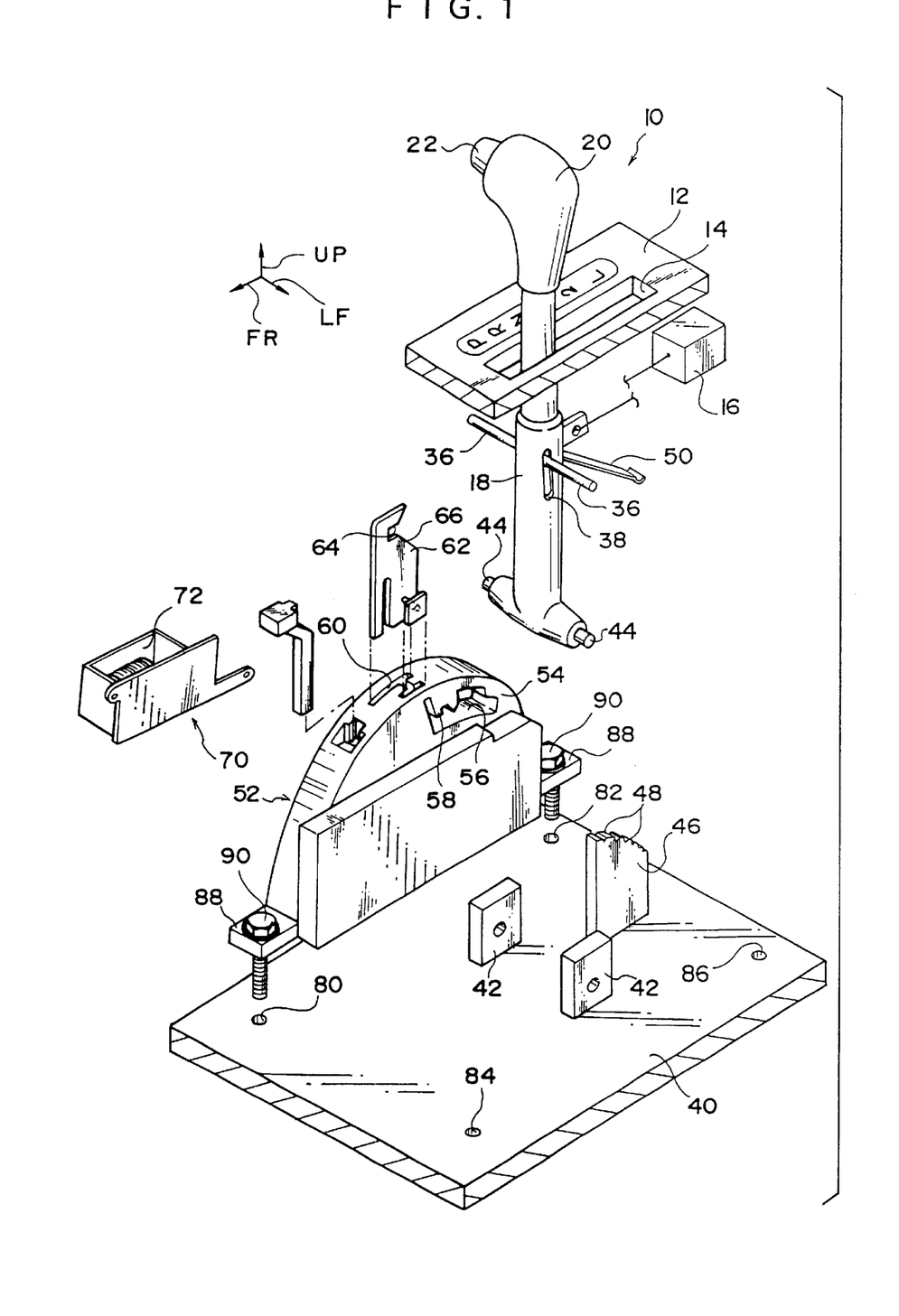
FIG. 1 is an exploded perspective view showing a shift lever apparatus according to a first embodiment of the present invention.

FIG. 1 is an exploded perspective view of a shift lever apparatus 10 according to a first embodiment of the present invention. As shown in FIG. 1, the shift lever apparatus 10 comprises a housing 12. The housing 12 is formed in a plate-like configuration or in a substantially box-like configuration which is open substantially toward the bottom of the vehicle (toward the side opposite to the direction of arrow UP shown in FIG. 1). (In the present first embodiment, the housing is formed in a plate-shaped configuration.) This housing 12 is fixed to the floor portion (not shown in the drawings) or the like of the vehicle. On an upper wall portion of the housing 12, an elongated hole shaped shift hole 14 is formed such that the longitudinal direction thereof run substantially along the longitudinal direction of the vehicle (the direction of arrow FR shown in FIG. 1 and the direction opposite thereto). Furthermore, in the case where the housing 12 is provided in a "right-hand drive vehicle" in which the driver's seat is located on the right side of the vehicle relative to the front passenger's seat, characters such as "P", "R", "N", "D" and the like, which correspond to a plurality of shift ranges set in an automatic gearbox 16 which serves as a gearbox, are provided substantially at the vehicle right side of the shift hole 14 (at the side opposite the direction of arrow LF shown in FIG. 1). In the case of a "left-hand drive vehicle" in which the driver's seat is located on the left side of the vehicle relative to the front passenger's seat, the aforementioned characters are provided substantially at the vehicle side of the shift hole 14 (at the side of the direction of an arrow LF).

Figure 4:
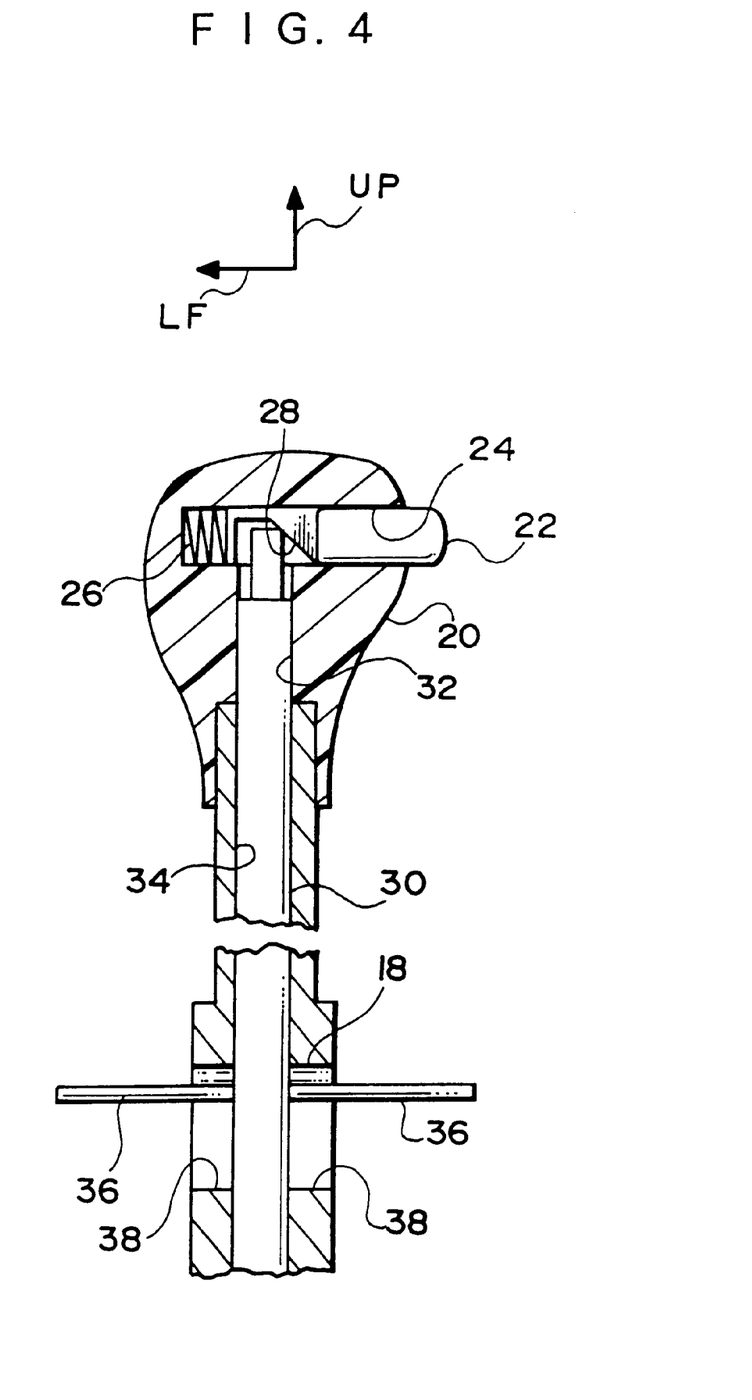
FIG. 4 is a sectional view showing a shift lever.

A hollow rod-like shift lever 18 penetrates through the shift hole 14 of the housing 12, such that the longitudinal direction runs substantially along the upward and downward (i.e., vertical) direction of the vehicle (the direction of arrow UP shown in FIG. 1, and the direction opposite thereto) Furthermore, on an upper end portion of the shift lever 18, a knob 20 which is to be grasped for operation is provided. In the case where the knob 20 is used in a "right-hand drive vehicle", a button 22 is provided on a right end portion of the knob 20. In the case where the knob 20 is used in a "left-hand drive vehicle", the button 22 is provided on the left end portion of the knob 20. As shown in the sectional view of FIG. 4 showing the knob 20 for use in a "right-hand drive vehicle", a transverse hole 24 is formed in the knob 20 and opens at the right end of the knob 20. The button 22 enters into the transverse hole 24 so as to be slidable substantially along the left-and-right direction of the vehicle (the direction of arrow LF of FIG. 4 and the direction opposite thereto). (In the case of the knob 20 which is applied to a "left-hand drive vehicle", the transverse hole 24 opens to the left side, and a detailed explanation thereof will be omitted.) Furthermore, a compression coil spring 26 is disposed at the end portion of the transverse hole 24, such that the button 22 is urged toward the opening of the transverse hole 24. Furthermore, on the button 22, a cam portion 28 is formed which has an inclined substantially toward the bottom of the vehicle and the end portion of the transverse hole 24. Thus, the cam portion 28 comes into contact with the upper end portion of a bar-like detent rod 30 which serves as a rod and whose longitudinal direction runs along the longitudinal direction of the shift lever 18.

The detent rod 30 is slidably accommodated within a vertical hole 32 and a vertical hole 34. The upper end portion of the vertical hole 32 communicates with the intermediate portion of the transverse hole 24, and the lower end portion of the vertical hole 32 opens at the lower end portion of the knob 20. The vertical hole 34 is formed in a main body portion of the shift lever 18, and communicates coaxially with the vertical hole 32 when the knob 20 is mounted to the main body portion of the shift lever 18. The detent rod 30 is urged by the urging force of an urging means such as a compression coil spring or the like (not shown) in an upward direction, namely, in a direction of pressing the cam portion 28 of the knob 20. Detent pins 36, which serve as projecting portions, are formed so as to project from the longitudinal direction intermediate portion of the detent rod 30 substantially toward both the left and right sides of the vehicle (i.e., in the direction of arrow LF in FIG. 4 and the direction opposite thereto).

The detent pins 36 penetrate through a pair of long holes 38, which are formed such that the longitudinal direction thereof runs along the longitudinal direction of the shift lever 18, and project toward the outer sides of the shift lever 18.

A plate-shaped base 40 is provided below the shift lever 18 which is formed as described above. On the base 40, a pair of vertical walls 42 are erected which are located opposite to each other approximately along the left-and-right direction of the vehicle (the direction of arrow LF shown in FIG. 1 and the direction opposite thereto). A shaft 44 penetrating through the shift lever 18 is supported at these vertical walls 42.

Furthermore, an adjustment plate 46 is formed upright on the base 40. On the upper end portion of the adjustment plate 46, a plurality of adjustment notches 48 are formed along the pivoting direction of the shift lever 18. The distal end portion of an angle adjusting spring 50 enters into one of the plural angle adjusting holes 48. The base end portion of the angle adjusting spring 50 is mounted to the longitudinal direction intermediate portion of the shift lever 18 such that the distal end portion of the angle adjusting spring 50 is directed substantially toward the rear of the vehicle. The adjustment spring 50 is a plate spring having a spring force in a direction of approaching the upper end portion of the adjustment plate 46. When the shift lever 18 is pivoted around the shaft 44, the distal end portion of the adjustment spring 50 moves on the upper end portion of the adjustment plate 46 in contact with the upper end portion of the adjustment plate 46. When the distal end portion of the angle adjusting spring 50 opposes one of the angle adjusting holes 48, the distal end portion enters into that angle adjusting hole 48 due to the spring force of the angle adjusting spring 50.

Furthermore, through holes 80 and 82 serving as a first holding portion and through holes 84 and 86 serving as a second holding portion are formed in the case 40. The through holes 80 and 84 are formed substantially in the vicinity of the vehicle front side end portion of the base 40. The through holes 80 and 84 are formed at positions at the outer sides of the pair of vertical walls 42 along the substantially transverse direction of the vehicle, and at positions separated by equal distances from the vehicle transverse direction center the base 40. On the other hand, the through hole 82 and the through hole 86 are both formed substantially in the vicinity of the vehicle rear side end portion of the base 40. The through holes 82 and 84 are formed at positions at the outer sides of the pair of the vertical walls 42 along the substantially transverse direction of the vehicle, and at positions separated from the vehicle transverse direction center of the base 40 by the same distances as the through holes 82 and 84.

Here, the positions of the adjustment holes 48 are set so that the distal end portion of the adjustment spring 50 enters into one of the adjustment holes 48 when the shift lever 18 is positioned next to one of the characters which are formed next to the shift hole 14, namely, when the automatic gearbox 16 is changed to a shift range corresponding to one of the characters next to the shift lever 18. When the shift lever 18 is operated, the shift position of the shift lever 18 can be confirmed, without visually confirming the position of the shift lever 18, and merely by feeling the resistance at the time when the adjustment spring 50 enters into one of the adjustment holes 48 due its own spring force.

Furthermore, a shift lock solenoid housing 52 serving as a detent member is fixed to the base 40. A bolt fastening portion 88 is formed at each of the vehicle longitudinal direction end portions of the shift lock solenoid housing 52. A bolt 90 passes through the bolt fastening portion 88 so as to be freely rotatable around its own axis. The bolt 90 further toward the front of the vehicle can pass through the through hole 80 and the through hole 84, whereas the bolt 90 further toward the rear of the vehicle can pass through the through hole 82 and the through hole 86. When nuts (not shown) are fastened from the opposite side of the shift lock solenoid housing 52 via the base 40 in the state in which one of the bolts 90 passes through the through hole 82 and the other bolt 90 is passes through the through hole 82, the shift lock solenoid housing 52 is fixed to the right side of the shift lever 18. Furthermore, when nuts (not shown) are fastened from the opposite side of the shift lock solenoid housing 52 via the base 40 in the state in which one bolt 90 passes through the through hole 86 and the other bolt 90 passes through the through hole 86, the shift lock solenoid housing 52 is fixed to the left side of the shift lever 18.

Figure 3:
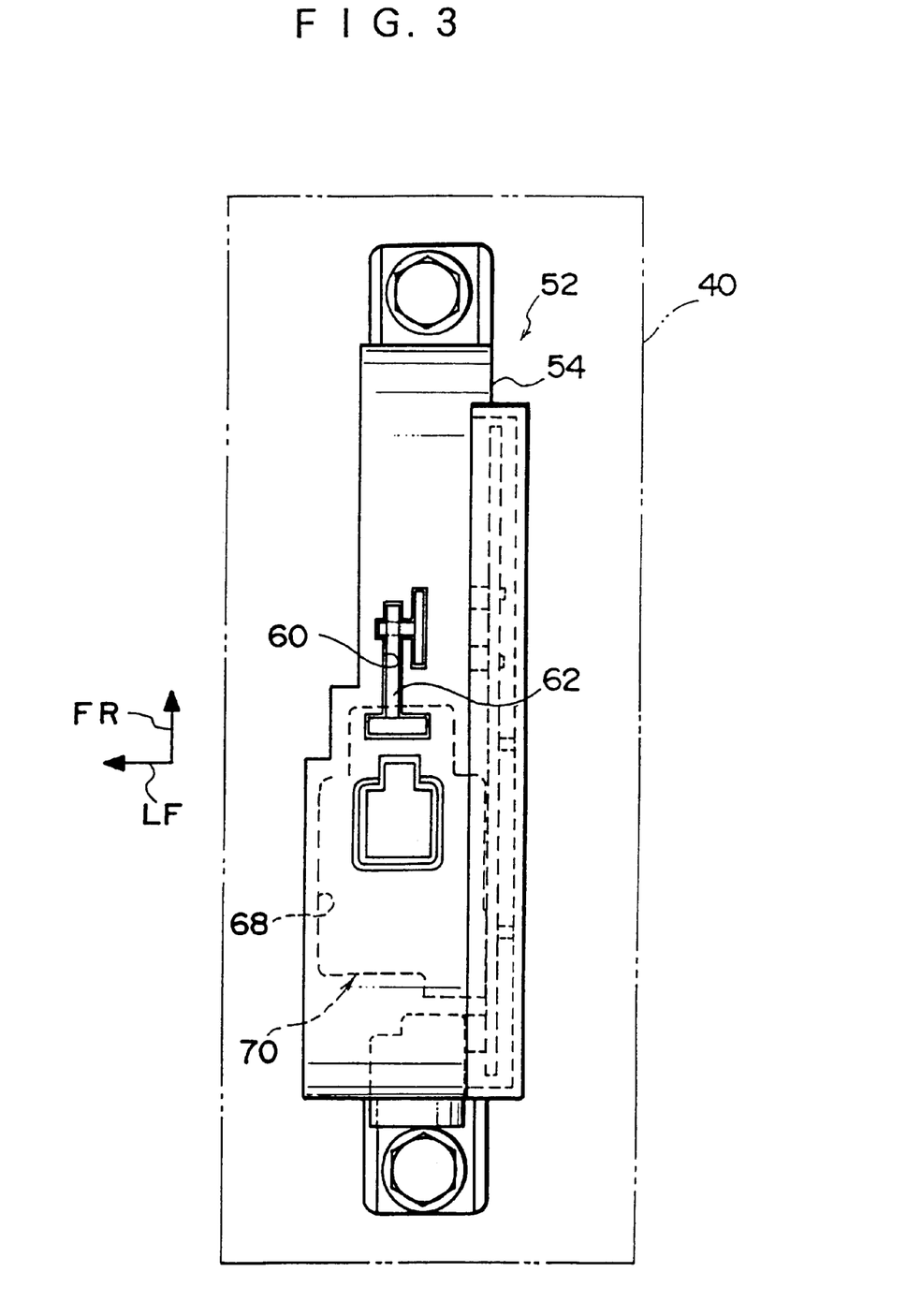
FIG. 3 is a plan view showing the detent member of the shift lever apparatus according to the first embodiment of the present invention.

Furthermore, as shown in FIGS. 1 and 3, the shift lock solenoid housing 52 is provided with a plate portion 54 whose widthwise direction runs substantially along the left-and right (transverse) direction of the vehicle (the direction of arrow LF shown in FIGS. 1 and 3 and the direction opposite thereto). A detent hole 56 which penetrates along the widthwise direction of the plate portion 54, is formed in the plate portion 54. When the shift lever apparatus 10 according to the present invention is applied to a "right-hand drive vehicle", the distal end portion of the detent pin 36 described above enters the detent hole 56 from the left side of the shift lock housing 52. On the other hand, when the shift lever apparatus 10 according to the present invention is applied to a "left-hand drive vehicle", the distal end portion of the detent pin 36 enters the detent hole 56 from the right side of the shift lever 36.

A restricting portion 58 is formed so as to project downwardly from the upper side of the inner circumferential portion of the detent hole 56. The restricting portion 58 is formed on the locus of pivoting of the detent pin 36 at the time when the shift lever 18 is pivoted between an "N position" and a "P position", among the plural shift ranges set at the automatic gearbox 16. The "N position" is a shift position of the shift lever 18 which corresponds to a neutral range in which transmission of driving force from the engine to the drive wheels of the vehicle is blocked and the drive wheels can rotate freely. The "P position" is a shift position of the shift lever 18 which corresponds to a parking range in which transmission of driving force from the engine to the drive wheels of the vehicle is blocked and the drive wheels are locked. In a state in which the detent pins 36 are positioned at the top end sides of the elongated holes 36 and an attempt is made to pivot the shift lever 18 from the "N position" to the "P position" or an "R position" (which is a shift position of the shift lever 18 corresponding to a reverse range in which the drive wheels of the vehicle are rotated reversely) or to pivot the shift lever 18 from the "P position" to the "R position" or the "N position", the detent pin 36 abuts the restricting portion 58 so that pivoting of the detent pin 36 is restricted. As a result, in this state, the shift lever 18 cannot be pivoted to the aforementioned shift position. However, by pressing the button 22 so as to lower the detent rod 30 until the detent pins 36 are positioned in vicinities of the lower end portions of the elongated holes 38, the detent pin 36 can avoid the restricting portion 58. In this state, the shift lever 18 can be pivoted to the aforementioned shift position.

Figure 2:
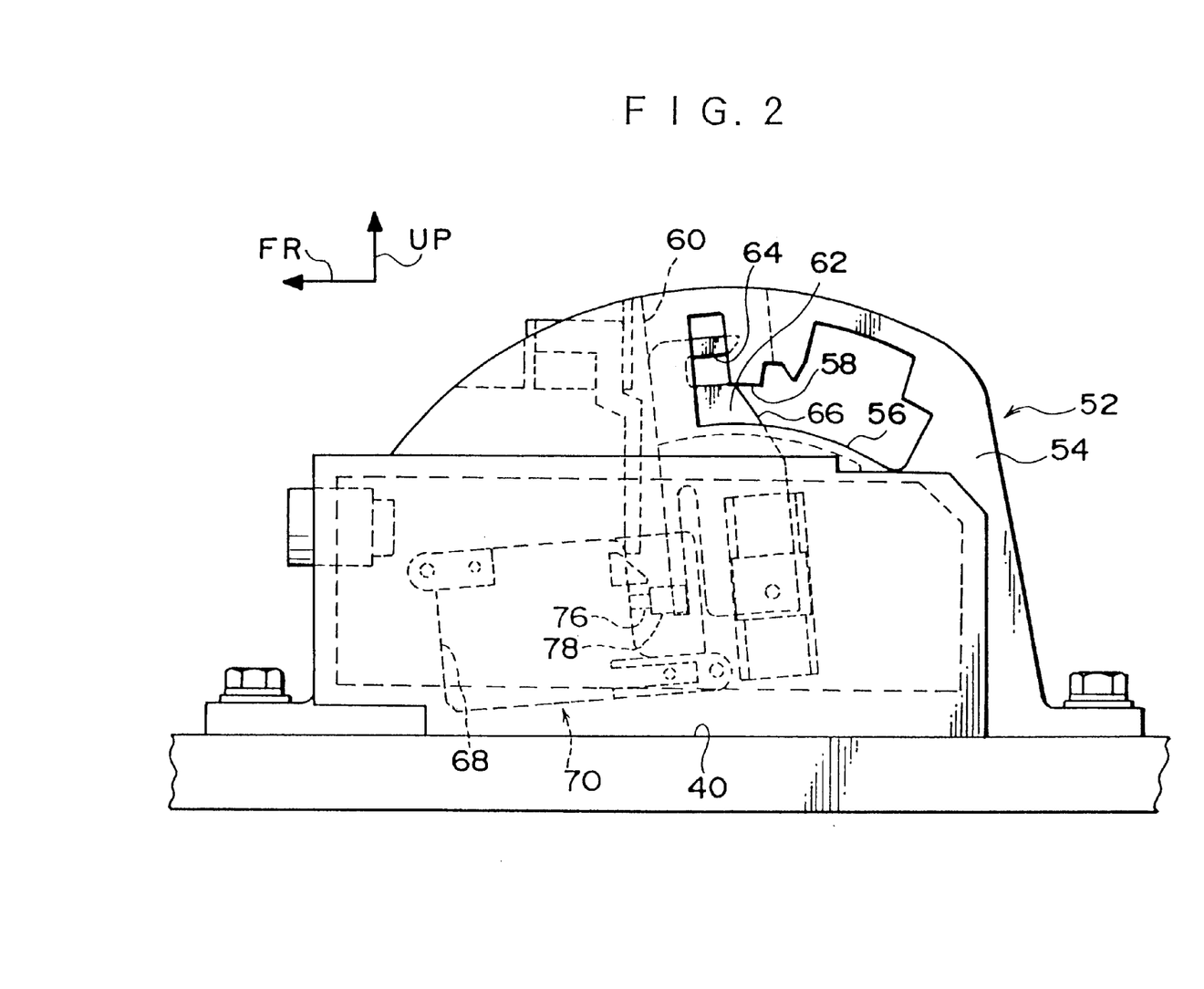
FIG. 2 is a side view showing a detent member of the shift lever apparatus according to the first embodiment of the present invention.

Furthermore, as shown in FIGS. 1 to 3, a guide hole 60 which opens at the upper end portion of the plate portion 54 is formed inside of the plate portion 54. The guide hole 60 is formed in such a manner that the bottom portion thereof is located at a position lower than the lower side of the circumferential end portion of the detent hole 56, and the guide hole 60 communicates with the detent hole 56 between the opening portion and the bottom portion of the detent hole 56. Inside of the guide hole 60, a plate-like shift lock plate 62 is accommodated between the opening portion and the bottom portion of the guide hole 60 in a slidable manner. As shown in FIGS. 1 and 2, a groove portion 64 is formed in the shift lock plate 62. The groove portion 64 is open substantially toward the rear side of the vehicle in the state in which the shift lock plate 62 is accommodated in the guide hole 60. The widthwise dimension of the groove portion 64 is larger than the external diameter of the detent pin 36. Furthermore, the opening portion of the groove portion 64 is located on the locus of movement of the detent pin 36 at the time when the shift lever 18 is shifted to the "P position" from the "R position". The bottom portion of the groove portion 64 is located further toward the front of the vehicle than the detent pin 36 in the case where the shift lever 18 has been shifted to the "P position". Furthermore, the shift lock plate 62 can be moved toward the bottom portion of the guide hole 60 until the groove portion 64 is located at a position lower than the lower end portion of the restricting portion 58. Consequently, the detent pin 36 which has avoided the restricting portion 58 can enter into the groove portion 64. Furthermore, when the detent pins 30 are moved to the upper end portions of the elongated holes 38 due to the urging force of the urging means which urges the detent rods 30 upwardly, the detent rod 30 is pressed against the upper side of the inner periphery of the groove portion 64 so that the shift lock plate 62 is lifted and slid upward.

Furthermore, as shown in FIGS. 1 and 2, a cam portion 66 is formed at the opening end side of the groove portion 64. The camportion 66 is formed as an inclined surface which is inclined downwardly along the direction substantially toward the rear of the vehicle.

Figure 5:
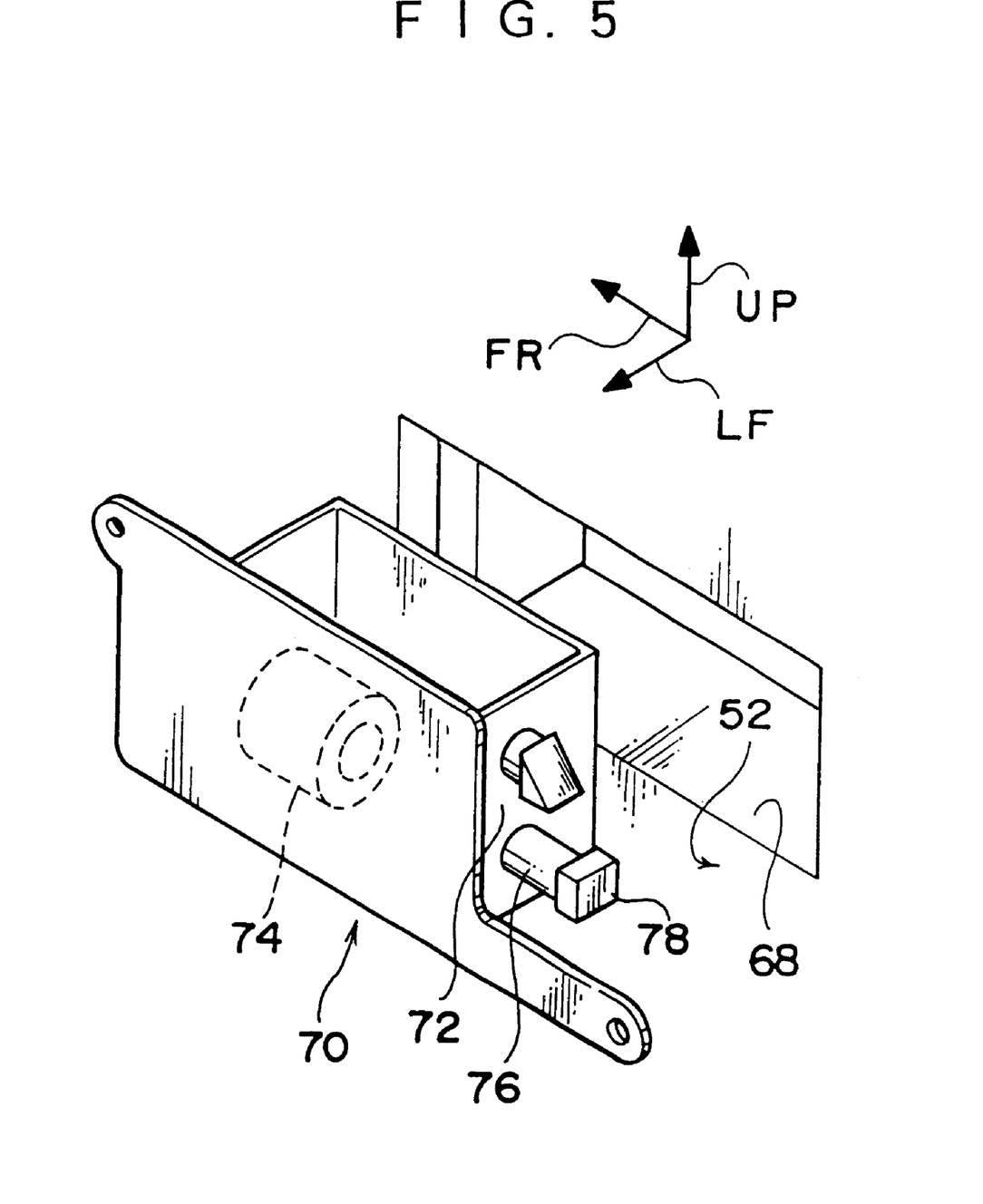
FIG. 5 is a perspective view showing a shift lock solenoid which serves as a locking device.

Furthermore, as shown in FIGS. 3 and 5, a solenoid accommodation portion 68 is formed in the shift lock solenoid housing 52. The solenoid accommodation portion 68 is a concave portion which is open at the end surface of the shift lock solenoid housing 52, at the side substantially toward the right of the vehicle. As shown in FIG. 2, the solenoid accommodation portion 68 is formed at a position lower than the detent hole 56 and further toward the front of the vehicle than the groove portion 64. A shift lock solenoid 70 serving as a shift lock device is accommodated within the solenoid accommodation portion 68. The shift lock solenoid 70 is provided with a solenoid main body 72 which has a substantially box-like shape. A coil 74, which is tubular and whose axial direction is substantially the longitudinal direction of the vehicle, is accommodated in the solenoid main body 72. The coil 74 is electrically connected to the battery and to a shift lock computer (both not shown) provided in the vehicle, and generates magnetic force due to electric power being supplied from the battery so as to energize the coil 74. Furthermore, a bar like plunger 76 is provided at the solenoid main body 72 so as to be slidable substantially along the longitudinal direction of the vehicle. The plunger 76 is formed such that the longitudinal direction thereof runs substantially along the longitudinal direction of the vehicle.

The portion of the plunger 76 further toward the front of the vehicle than the longitudinal direction intermediate portion thereof is accommodated in the solenoid main body 72. When the coil 74 is energized, the plunger 76 is pulled into the solenoid main body 72 due to the magnetic force, and is slid substantially toward the front of the vehicle. The plunger 76 is always urged substantially toward the rear of the vehicle by an urging means (not illustrated) such as a compression coil spring. When the coil 74 is not energized, a predetermined amount of the plunger 76 protrudes from the solenoid main body 72.

Furthermore, a stopper 78 is provided on the distal end portion of the plunger 76. In the state in which the coil 74 is not energized and the plunger 76 is projected from the solenoid main body 72, the stopper 78 is located on the locus of sliding of the shift lock plate 62 which runs along the guide hole 60 at a position lower than the shift lock plate 62, and the downward displacement of the shift lock plate 62 is restricted. In the state in which downward displacement of the shift lock plate 62 is restricted by the stopper 78, the groove portion 64 is not located at a position lower than the restricting portion 58 of the detent hole 56.

Next, operation and effects of the present embodiment will be described.

In the shift lever apparatus 10 according to the present invention, in the case where the shift lever 18 is located at a shift position other than the "P position", the button 22 is pressed such that the detent rod 30 is lowered. In this state, when the shift lever 18 is shifted toward the "P position", the detent pin 36 passes beneath the restricting portion 58 and abuts the cam portion 66 of the shift lock plate 62. At this time, when the shift lock computer satisfies various conditions for energizing the coil 74 of the shift lock solenoid 70 (such as the brake is being operated or the like) by shifting the shift lever 18 further such that the cam portion 66 is pushed substantially toward the front of the vehicle by the detent pin 36, the shift lock plate 62 is pushed down until the opening end of the groove portion 64 and the detent pin 36 oppose each other. When the shift lever 18 is shifted to the "P position", the detent pin 36 enters into the bottom portion of the groove portion 64. In this state, when the force pushing the button 22 is released, the detent rod 30 is moved upward by the urging force of the urging means which urges the detent rod 30, and the detent pins 36 move to the upper ends of the elongated holes 38. When the detent pins 36 move to the upper ends of the elongated holes 38, the detent pin 36 pushes the inner wall of the groove portion 64 upward. Therefore, the shift lock plate 62 slides upward along the guide hole 60.

In this state, if an operation is carried out such as the depressing o f the brake pedal is released or the ignition key is pulled out of the key cylinder, the shift lock computer stops the energizing of the coil 74. The plunger 76 thereby projects substantially toward the rear of the vehicle, and the stopper 78 limits the downward movement of the shift lock plate 62. In this state, when the button 22 is pushed and the detent rod 30 is lowered, the detent pin 36 pushes the groove portion 64 and the shift lock plate 62 attempts to slide downward, but the lowering of the shift lock plate 62 is restricted by the stopper 78. Thus, the shift lock plate 62 cannot be lowered to the position at which the groove portion 64 is positioned lower than the restricting portion 58. Accordingly, in this state, the shift lever 18 cannot be shifted from the "P position" to another shift position, and the shift range of the automatic gearbox 16 cannot be changed to a shift range other than the parking range. (This state is called the P shift lock state.) As a result, changing of the shift range due to inadvertent shifting operation in a state in which the shift lock computer does not satisfy various conditions for energizing the coil 74 (such as the brake pedal being depressed) can be prevented.

When the bolts 90 are passed through the th rough holes 80, 82 and fixed by nuts, the shift lock solenoid housing 52 is fixed at the right side of the shift lever 18. In this case, judging from the relative positional relationship between the shift lever 18 and the shift lock solenoid housing 52, the present shift lever apparatus 10 is used for a "left-hand drive vehicle". Further, when the bolts 90 are passed through the through holes 84, 86 and fixed by nuts, the shift lock solenoid housing 52 is fixed at the left side of the shift lever 18. Therefore, in this case, judging from the relative positional relationship between the shift lever 18 and the shift lock solenoid housing 52, the present shift lever apparatus 10 is used for a "right-hand drive vehicle".

In the present shift lever apparatus 10, not only is it possible to change the relative positional relationship between the shift lever 18 and the shift lock solenoid housing 52, but also, because the plate portion 54 has a configuration which allows the detent pins 36 to pass through the thickness direction thereof, the detent pins 36 can enter into the plate portion 54 from either thickness direction side thereof. Further, the guide hole 60 is formed in the plate portion 54 in which the detent hole 56 is formed. The shift lock plate 62 is slidably accommodated in the guide hole 60. The solenoid accommodating portion 68, which accommodates the shift lock solenoid 70 which is a mechanism for restricting the lowering of the shift lock plate 62, is formed integrally with the plate portion 54 and the shift lock solenoid housing 52 structure. Accordingly, even in the structure in which the detent pin 36 is made to enter into the plate portion 54 from ether thickness direction side of the plate portion 54, the structure of the shift lock solenoid housing 52 itself does not change. As a result, the shift lock solenoid housing 52 can be disposed at either the right side or the left side of the shift lever 18. Thus, the shift lock solenoid housing 52 can be used for both a "right-hand drive vehicle" and for a "left hand drive vehicle".

Next, a second embodiment of the present invention will be described.

Figure 6:
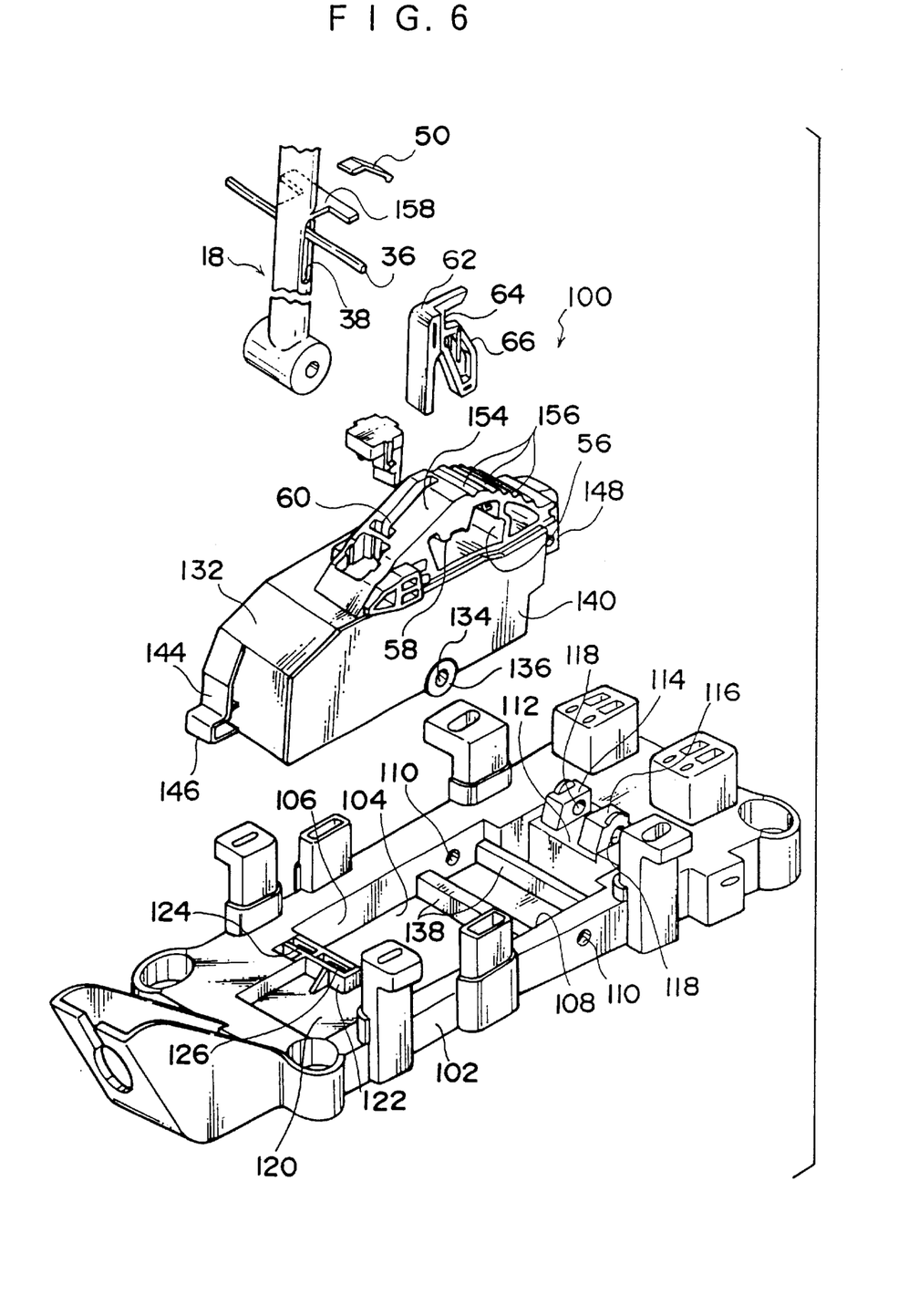
FIG. 6 is an exploded perspective view showing main portions of a shift lever apparatus according to a second embodiment of the present invention.

FIG. 6 is an exploded perspective view illustrating the structures of main portions of a shift lever apparatus 100 relating to a second embodiment of the present invention. As illustrated in FIG. 6, the shift lever apparatus 100 includes a base 102. The base 102 is formed as a thick plate. In the substantially central portion in the widthwise direction and lengthwise direction of the base 102, an opening 104 which opens toward one thickness direction side of the base 102 is formed. Shaft receiving holes 110, which are formed along the widthwise direction of the base 102, are formed in inner walls 106, 108 of the opening 104, which inner walls 106, 108 oppose one another along the widthwise direction of the base 102. A shaft (not shown) passes through the shaft receiving holes 110, and through the base end portion of the shift lever 18. In this way, the shift lever 18 is supported on the base 102 so as to be pivotable around the shaft. A step portion 112, which is one step lower than the surface of the base 102, is formed at one longitudinal direction end of the opening 104 (base 102). An engagement block 114 serving as a first holding portion and an engagement block 116 serving as a second holding portion are provided on the step portion 112 so as to oppose one another along the widthwise direction of the base 102. Through holes 118, which are formed along the widthwise direction of the base 102, are formed coaxially in the engagement blocks 114, 116.

Figure 7:
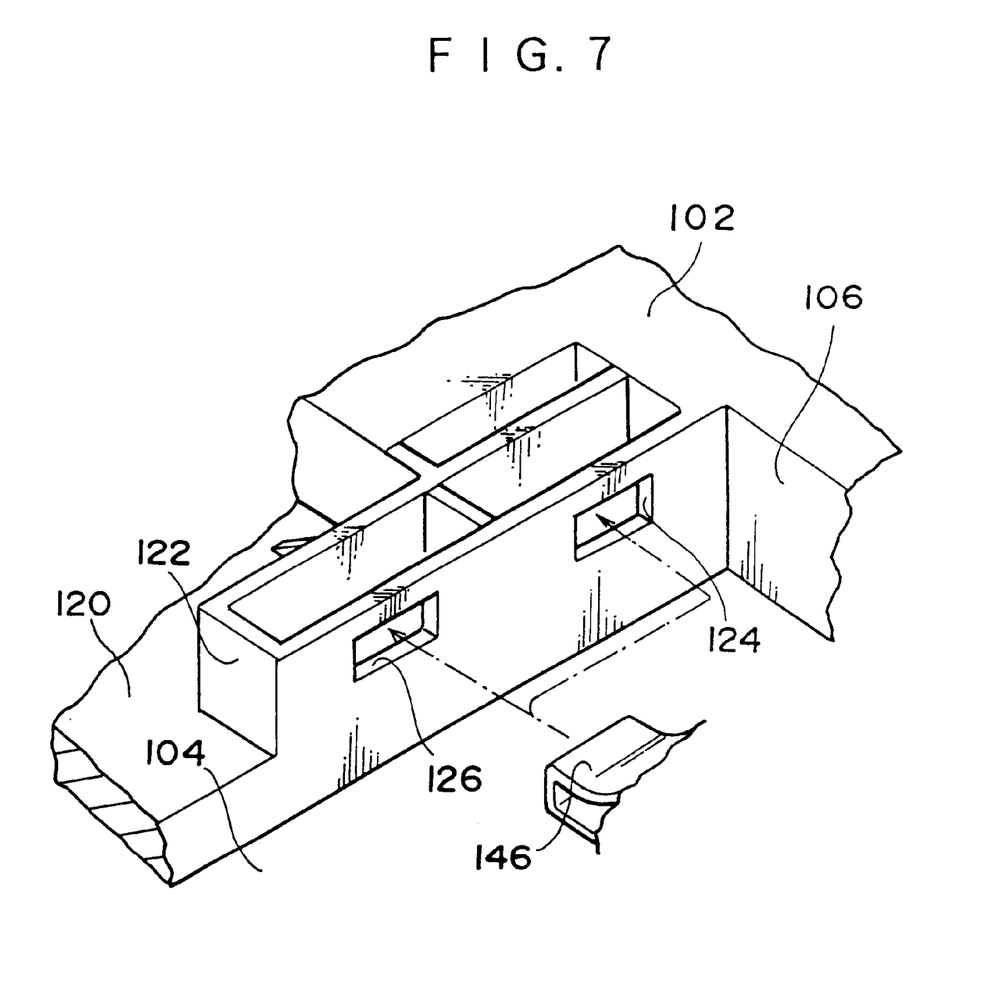
FIG. 7 is an enlarged perspective view showing a first holding portion and a second holding portion in the shift lever apparatus according to the second embodiment of the present invention.

A step portion 120, which is one step lower than the surface of the base 102, is formed at the other longitudinal direction end side of the opening 104 (base 102). A holding frame 122 is formed on the step portion 120. The holding frame 122 is formed by vertical walls which stand upright on the step portion 120. A holding hole 124 serving as a first holding portion and a holding hole 126 serving as a second holding portion, which are formed so as to pass through along the longitudinal direction of the base 102, are formed in the vertical wall positioned at one base 102 longitudinal direction side among the vertical walls which form the holding frame 122. As illustrated in FIG. 7, the longitudinal directions of these holding holes 124, 126 are the widthwise direction of the base 102. The holding holes 124, 126 are formed so as to be separated, along the longitudinal direction thereof, by an interval which corresponds to the interval between the engagement block 114 and the engagement block 116.

The present shift lever apparatus 100 is provided with a shift lock solenoid housing 132 which corresponds to the shift lock solenoid housing 52 of the first embodiment described above. The height wise direction of the shift lock solenoid housing 132 corresponds to the direction of thickness of the base 102. A shaft pass through portion 136 is formed at the bottom end portion of the shift lock solenoid housing 132. A through hole 134, which is formed so as to extend along the widthwise direction of the base 102 and the shift lock solenoid housing 132, is formed in the shaft pass through portion 136. In a state in which the shift lock solenoid housing 132 is disposed at a predetermined position on a pair of vertical wall portions 138 which are formed inside of the opening 104 so as to extend between the inner wall 106 and the inner wall 108 of the opening 104, the through hole 134 of the shaft pass through portion 136 is aligned coaxially with the shaft receiving holes 110, and the shaft which passes through the shaft receiving holes 110 also passes through the through hole 134. In this way, the shift lock solenoid housing 132 is positioned with respect to the base 102 along the longitudinal direction of the base 102.

Further, although not illustrated, the shift lock solenoid housing 132 is open toward one transverse direction side of the base 102, and is closed thereat by a cover 140. The shift lock plate 62, a shift lock solenoid corresponding to the shift lock solenoid 70 of the first embodiment, and the like are fixed or are held so as to be movable in a predetermined direction within the shift lock solenoid housing 132.

An engagement rib 144 is formed at an end portion of the shift lock solenoid housing 132 at the side corresponding to the other longitudinal direction end side of the base 102. The longitudinal direction of the engagement rib 144 is the heightwise direction of the shift lock solenoid housing 132. An engagement portion 146, which projects toward the other longitudinal direction end side of the base 102, is formed at one longitudinal direction end portion of the engagement rib 144. The engagement portion 146 has a configuration which can be inserted into the holding holes 124, 126. By inserting the engagement portion 146 into the holding hole 124 or the holding hole 126, displacement of the engagement portion 146 along the widthwise direction of the base 102 and the heightwise direction of the shift lock solenoid housing 132 is restricted.

Figure 8:
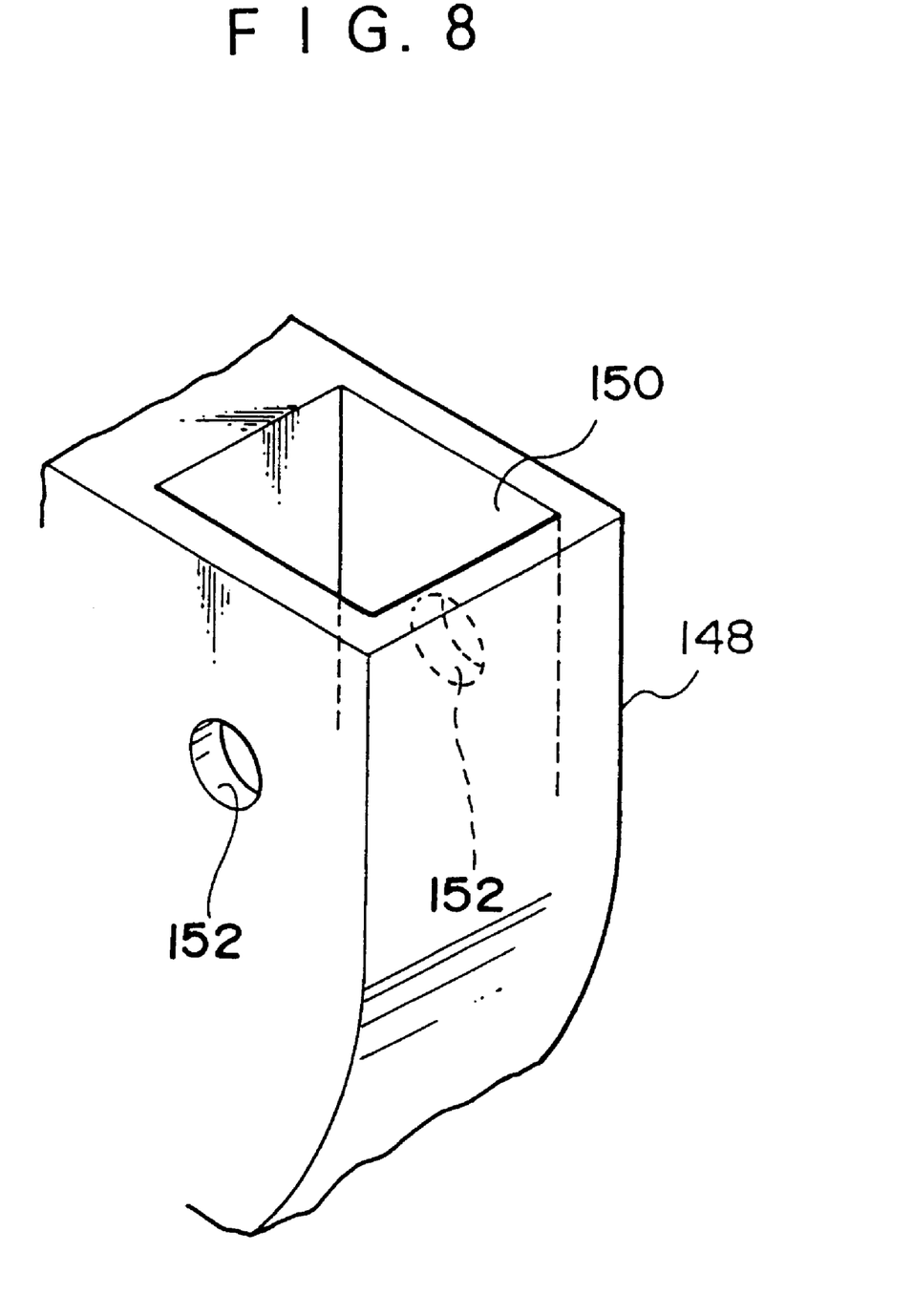
FIG. 8 is an enlarged perspective view showing a portion which is held in another first holding portion and in another second holding portion of a detent member in the shift lever apparatus according to the second embodiment of the present invention.

A block-shaped engagement portion 148 is formed at the end portion of the shift lock solenoid housing 132 which corresponds to the one longitudinal direction end side of the base 102. As illustrated in FIG. 8, a rectangular engagement hole 150, which opens toward the base 102, is formed in the engagement portion 148. The engagement blocks 114, 116 can be inserted into the engagement hole 150. When the engagement portion 146 of the engagement rib 144 is inserted into the holding hole 124, the engagement block 114 is inserted into the engagement hole 150 of the engagement portion 148. When the engagement portion 146 of the engagement rib 144 is inserted into the holding hole 126, the engagement block 116 is inserted into the engagement hole 150 of the engagement portion 148. In this way, at the present shift lever apparatus 100, the position of the shift lock solenoid housing 132 along the transverse direction of the base 102 with respect to the base 102 differs by engaging the engagement portion 146 to either the holding hole 124 or the holding hole 126 (namely, by engaging either the engagement block 114 or the engagement block 116 with the engagement hole 150 of the engagement portion 148).

Further, through holes 152 which pass through along the transverse direction of the base 102 are formed in the engagement portion 148. A fixing shaft which passes through the through hole 118 of the engagement block 114 or the engagement block 116 passes through the through holes 152, so that relative movement of the engagement portion 148 with respect to the engagement block 114 or the engagement block 116 is restricted.

A detent portion 154 corresponding to the plate portion 54 in the first embodiment is formed at one heightwise direction side of the shift lock solenoid housing 132. The thickness direction of the detent portion 154 runs along the widthwise direction of the base 102. A detent hole 56 which runs along the thickness direction of the detent portion 154 is formed in the detent portion 154. The guide hole 60, which opens at the end surface at the opposite side of the main body portion of the shift lock solenoid housing 132, is formed in the detent portion 154. The end surface of the detent portion 154 at the side opposite the main body portion of the shift lock solenoid housing 132 is formed as a curved surface. The portion of the curved surface which is further toward the one longitudinal direction end of the base 102 than the intermediate portion of the curved surface (i.e., the engagement portion 148 side of the curved surface) protrudes toward the side opposite the base 102.

The curvature of this curved surface is about equal to the curvature of the circumference around an axis whose center is at the shaft receiving holes 110 and whose axial direction is the widthwise direction of the base 102. Plural adjustment holes 156 are formed intermittently along the peripheral direction of the curved surface. The distal end portion of the adjustment spring 50 can be inserted into the adjustment holes 156. One end of the adjustment spring 50 is supported at a adjustment spring supporting portion 158 formed at the shift lever 18. In the above-described first embodiment, the adjustment spring 50 has spring force in a direction of approaching the upper end portion of the adjustment plate 46. However, in the present second embodiment, the adjustment spring 50 has spring force in a direction approaching the end surfaces of the adjustment holes 156, which end surfaces are at the side opposite the base 102. Namely, in the present second embodiment, the adjustment holes 156 also function as the adjustment plate 46 of the first embodiment.

The present shift lever apparatus 100 having the above described structure is fixed, for example, between the driver's seat and the front passenger's seat of a vehicle body such that the longitudinal direction of the base 102 runs substantially along the longitudinal direction of the vehicle. The position, along the transverse direction of the base 102, of the shift lock solenoid housing 132 with respect to the base 102 differs in the following cases (1) and (2): (1) the case when the engagement portion 146 of the engagement rib 144 is inserted into the holding hole 124 of the holding frame 122, and the engagement block 114 is inserted into the engagement hole 150 of the engagement portion 148, and (2) the case when the engagement portion 146 of the engagement rib 144 is inserted into the holding hole 126 of the holding frame 122, and the engagement block 116 is inserted into the engagement hole 150 of the engagement portion 148. In the state in which the engagement portion 146 of the engagement rib 144 is inserted into the holding hole 124 of the holding frame 122 and the engagement block 114 is inserted into the engagement hole 150 of the engagement portion 148 (i.e., in case (1)), the shift lever 18 is provided at the inner wall 108 side, which is at the side of the shift lock solenoid housing 132 opposite to the side at which the inner wall 106 is at. This state corresponds to a right-hand drive vehicle. Further, in the case when the engagement portion 146 of the engagement rib 144 is inserted into the holding hole 126 of the holding frame 122 and the engagement block 116 is inserted into the engagement hole 150 of the engagement portion 148 (i.e., in case (2)), the shift lever 18 is provided at the inner wall 106 side, which is at the side of the shift lock solenoid housing 132 opposite to the side at which the inner wall 108 is at. This state corresponds to a left-hand drive vehicle. In this way, even if the position at which the shift lock solenoid housing 132 is mounted with respect to the base 102 is changed and the position at which the shift lever 18 is mounted to the shift lock solenoid housing 132 is changed, the detent pin 36 can enter into the detent hole 56 because the detent hole 56 passes though the detent portion 154 along the widthwise direction of the base 102. Further, even in the structure in which the detent pin 36 can enter into the detent hole 56 from either side of the detent portion 154, the structure of the shift lock solenoid housing 132 does not change. Thus, the shift lock solenoid housing 132 can be disposed either at the right side or the left side of the shift lever 18. The shift lock solenoid housing 132 can therefore be used for both a "right-hand drive vehicle" and for a "left-hand drive vehicle".

In the present second embodiment, the adjustment holes 156 are formed in the detent portion 154. There is a feeling that adjustment has taken place at the time the distal end of the adjustment spring 50 enters into an adjustment hole 156 when the shift lever 18 is positioned at a shift position. Thus, the adjustment holes 156 are of course formed such that the distal end of the adjustment spring 50 enters therein when the shift lever 18 is positioned at predetermined shift positions. Further, the detent pin 36 of the shift lever 18 pivots integrally in accordance with the shifting operation of the shift lever 18. Thus, when the shift lever 18 is at a predetermined shift position, which position of the detent hole 56 the detent pin 36 is in is determined as a matter of course. Namely, the position at which the detent hole 56 is formed in the shift lock solenoid housing 132 and the position of the restricting portion 58 and the positions of the adjustment holes 156 are determined by one of these positions being determined, and then the others being determined relatively thereto. In the present shift lever apparatus 100, the adjustment holes 156 are formed in the detent portion 154 of the shift lock solenoid housing 132 in which the detent hole 56 is formed. Thus, the relative positional accuracy of the adjustment holes 156 with respect to the detent hole 56 at the time when the shift lock solenoid housing 132 is being manufactured can be determined. In this way, at the time the respective members are being assembled together, relative errors between the configuration or position of the detent hole 56 and the distances between or the formed positions of the shift lock solenoid and the adjustment holes 156 can be suppressed or prevented.

What is claimed is:

1. A shift lever apparatus comprising:
    a shift lever connected to a gearbox of a vehicle, the shift lever, by being shift-operated to a predetermined shift position, changing a shift range to a predetermined shift range which corresponds to the predetermined shift position, among a plurality of shift ranges set at the gearbox;
    a rod integrally moved together with said shift lever within the shift lever due to shift-operation of said shift lever, said rod having a projection portion which is movable with respect to said shift lever due to a releasing operation and which projects toward an outer side of said shift lever;
    a detent member through which the projection portion penetrates, the detent member being located opposite the projection portion along a direction in which the projection portion moves as the shift lever is shift-operated, the plate portion of the detent member having a restricting portion formed on the detent hole which can be avoided by the projection portion by a releasing operation; and
    a base member supporting the shift lever in a pivotable manner and having a first holding portion for holding the detent member on one side of the shift lever and having a second holding portion for holding the detent member on the opposite side of the shift lever, the base member being made substantially integral with the detent member when said detent member is in one of the first holding portion and the second holding portion.

2. A shift lever apparatus according to claim 1, further comprising:
    an engaging member provided inside the detent member and engageable with the projection portion penetrating through the detent member and in an engaged state, the engaging member moving along with relative movement of the projection portion with respect to the shift lever; and
    a shift lock device provided at the detent member and restricting movement of the engaging member with respect to the projection portion, which movement accompanies the releasing operation, the shift lock device locking the projection portion indirectly via the engaging member.

3. A shift lever apparatus according to claim 2, further comprising an adjustment plate, and:
    an elastic member having a base end side fixed to the shift lever and a distal end side pressing against the adjustment plate due to resilient force, the distal end side being engaged against the adjustment plate when the shift lever is shift-operated; and
    an adjustment notch which is formed in the detent member and into which the distal end of the elastic member is allowed to enter with the resilient force of the elastic member in an opposite state in which the notch is located opposite to the distal end of the elastic member in a state in which the shift lever is located at the predetermined shift position.

4. A shift lever apparatus according to claim 2, further comprising a pair of wall members supporting the shift lever, the wall members formed upright on the base member and arranged opposite to each other, and including a shaft passing through the wall members, such that the shift lever is pivotable thereabout around the shaft.

5. A shift lever apparatus according to claim 2, wherein said detent member and said base member are engaged so as to be fixed.

6. A shift lever apparatus according to claim 2, wherein said there is provided on a surface of the base member an adjustment plate in which a plurality of adjustment notches are formed.

7. A shift lever apparatus according to claim 1, further comprising an adjustment plate, and:
    an elastic member having a base end side fixed to the shift lever and distal end side pressing against the adjustment plate due to resilient force, the distal end side being engaged against the adjustment plate when the shift lever is shift-operated; and
    an adjustment notch which is formed in the adjustment plate and into which the distal end of the elastic member enters due to resilient force of the elastic member in a state in which the notch is located opposite to the distal end of the elastic member in a state in which the shift lever is located at the predetermined shift position.

8. A shift lever apparatus according to claim 7, wherein the shift lever includes:
    an accommodation portion for accommodating the rod;
    a hole portion through which the projection portion passes so as to be movable along a longitudinal direction of the rod; and
    an operation mechanism for operating the shift lever.

9. A shift lever apparatus according to claim 1, further comprising a pair of wall members supporting the shift lever the wall members formed upright on the base member and arranged opposite to each other, and including a shaft passing through the wall members, such that the shift lever is pivotable thereabout around the shaft.

10. A shift lever apparatus according to claim 9, wherein there is provided on a surface of the base member an adjustment plate in which a plurality of adjustment notches are formed.

11. A shift lever apparatus according to claim 9, wherein said detent member and said base member are engaged so as to be fixed.

12. A shift lever apparatus according to claim 1, wherein the shift lever includes:
   an accommodation portion for accommodating the rod;
   a hole portion through which the projection portion passes so as to be movable along a longitudinal direction of the rod; and
   an operation mechanism for operating the shift lever.

13. A shift lever apparatus according to claim 12, wherein there is provided on a surface of the base member an adjustment plate in which a plurality of adjustment notches are formed.

14. A shift lever apparatus according to claim 1, wherein there is provided on a surface of the base member an adjustment plate in which a plurality of adjustment notches are formed.

15. A shift lever apparatus comprising:
   a shift lever connected to a gearbox of a vehicle, the shift lever, by being shift-operated to a predetermined shift position, changing a shift range to a predetermined shift range which corresponds to the predetermined shift position, among a plurality of shift ranges set at the gearbox;
   a rod integrally moved together with said shift lever within the shift lever due to shift-operation of said shift lever, said rod having a projection portion which is movable with respect to said shift lever due to a releasing operation and which projects toward an outer side of said shift lever;
   a detent member including a plate portion having a hole through which the projection portion penetrates, the detent member being located opposite the projection portion along a direction in which the projection portion moves as the shift lever is shift-operated, the plate portion of the detent member having a restricting portion formed on the detent hole which can be avoided by the projection portion by a releasing operation; and
   a base member for supporting the shift lever in a pivotable manner and having plural holding portions for holding the detent member at one of the left side and a right side of the shift lever, the base member being made substantially integral with the detent member when the detent member is held in one of the plural holding portions; and
   an adjustment recess formed on an upper surface of the detent member in communication with said hole along a direction of pivoting of a shift lever.

16. A shift lever apparatus according to claim 15, wherein a plurality of adjustment recesses are formed at a curvature which is substantially equal to a circumference around an axis whose center is said hole and whose axial direction is a widthwise direction of the base member.

17. A shift lever apparatus according to claim 16, wherein the shift lever includes:
   an accommodation portion for accommodating the rod;
   a hole portion through which the projection portion passes so as to be movable along a longitudinal direction of the rod; and
   an operation mechanism for operating the shift lever.

18. A shift lever apparatus according to claim 15, wherein the base member includes a surface having a step portion within an opening portion and the holding portions are provided therein, in such a manner that the holding portions oppose the step portion, which includes a height that is lower than the surface of the base member.

19. A shift lever apparatus according to claim 18, wherein said detent member and said base member are engaged so as to be fixed.

20. A shift lever apparatus according to claim 15, wherein the shift lever includes:
   an accommodation portion for accommodating the rod;
   a hole portion through which the projection portion passes so as to be movable along a longitudinal direction of the rod; and
   an operation mechanism for operating the shift lever.

\* \* \* \* \*